United States Patent
Matson et al.

(10) Patent No.: US 10,715,791 B2
(45) Date of Patent: Jul. 14, 2020

(54) VIRTUAL EYEGLASS SET FOR VIEWING ACTUAL SCENE THAT CORRECTS FOR DIFFERENT LOCATION OF LENSES THAN EYES

(71) Applicant: Google Inc., Mountain View, CA (US)

(72) Inventors: Samuel Mark Matson, East Palo Alto, CA (US); Dominik Philemon Kaeser, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 464 days.

(21) Appl. No.: 15/140,738

(22) Filed: Apr. 28, 2016

(65) Prior Publication Data
US 2016/0323567 A1 Nov. 3, 2016

Related U.S. Application Data

(60) Provisional application No. 62/155,424, filed on Apr. 30, 2015.

(51) Int. Cl.
*H04N 13/04* (2006.01)
*H04N 13/344* (2018.01)
(Continued)

(52) U.S. Cl.
CPC ......... *H04N 13/344* (2018.05); *G02B 27/017* (2013.01); *G02B 27/0172* (2013.01);
(Continued)

(58) Field of Classification Search
CPC .... G02B 2027/0127; G02B 2027/0129; G02B 2027/0132; G02B 2027/0138;
(Continued)

(56) References Cited

U.S. PATENT DOCUMENTS 5,621,424 A   4/1997 Shimada et al.
6,614,407 B2  9/2003 Perlman et al.
(Continued)

FOREIGN PATENT DOCUMENTS

CN    1635848 A    7/2005
CN  101872579 A   10/2010
(Continued)

OTHER PUBLICATIONS

International Search Report and Written Opinion received for PCT Patent Application No. PCT/US2016/029531, dated Aug. 26, 2016, 18 pages.
(Continued)

*Primary Examiner* — Md N Haque
(74) *Attorney, Agent, or Firm* — Brake Hughes Bellermann LLP

(57) ABSTRACT

A virtual eyeglass set may include a frame, a first virtual lens and second virtual lens, and a processor. The frame may mount onto a user's head and hold the first virtual lens in front of the user's left eye and the second virtual lens in front of the user's right eye. A first side of each lens may face the user and a second side of each lens may face away from the user. Each of the first virtual lens and the second virtual lens may include a light field display on the first side, and a light field camera on the second side. The processor may construct, for display on each of the light field displays based on image data received via each of the light field cameras, an image from a perspective of the user's respective eye.

17 Claims, 7 Drawing Sheets

(51) Int. Cl.
*G02B 27/01* (2006.01)
*H04N 13/307* (2018.01)

(52) U.S. Cl.
CPC ..... *H04N 13/307* (2018.05); *G02B 2027/014* (2013.01); *G02B 2027/0127* (2013.01); *G02B 2027/0129* (2013.01); *G02B 2027/0132* (2013.01); *G02B 2027/0138* (2013.01); *G02B 2027/0178* (2013.01)

(58) Field of Classification Search
CPC ...... G02B 2027/014; G02B 2027/0178; G02B 27/017; G02B 27/0172; H04N 13/0406; H04N 13/044
See application file for complete search history.

(56) References Cited

U.S. PATENT DOCUMENTS

| | | | |
|---|---|---|---|
| 8,290,358 | B1 | 10/2012 | Georgiev |
| 8,754,829 | B2 | 6/2014 | Lapstun |
| 8,891,954 | B1* | 11/2014 | Baker ............ G03B 15/03 396/162 |
| 2010/0302350 | A1* | 12/2010 | Shafer ............ H04N 13/279 348/53 |
| 2011/0234584 | A1* | 9/2011 | Endo ............ G02B 27/017 345/419 |
| 2013/0285885 | A1 | 10/2013 | Nowatzyk et al. |
| 2014/0054734 | A1* | 2/2014 | Dierre ............ H01L 31/0224 257/428 |
| 2014/0104392 | A1* | 4/2014 | Thorn ............ G06F 3/013 346/46 |
| 2014/0168035 | A1 | 6/2014 | Luebke et al. |
| 2014/0266988 | A1 | 9/2014 | Fisher et al. |
| 2014/0340390 | A1* | 11/2014 | Lanman ............ G06T 15/04 345/419 |
| 2014/0364228 | A1* | 12/2014 | Rimon ............ A63F 13/12 463/32 |
| 2014/0375771 | A1* | 12/2014 | Gabara ............ H04N 5/232 348/47 |

FOREIGN PATENT DOCUMENTS

| | | |
|---|---|---|
| CN | 102656878 A | 9/2012 |
| CN | 203206287 U | 9/2013 |
| CN | 104463949 A | 3/2015 |
| CN | 104469183 A | 3/2015 |
| JP | H8-191419 A | 7/1996 |
| JP | 2006208451 A | 8/2006 |
| JP | 2010011055 A | 1/2010 |
| JP | 2011205358 A | 10/2011 |
| JP | 2014071230 A | 4/2014 |
| WO | 2013162977 A1 | 10/2013 |
| WO | 2014203440 A1 | 12/2014 |

OTHER PUBLICATIONS

Invitation to Pay Additional Fees and Partial Search Report received for PCT Patent Application No. PCT/US2016/029531, dated Jul. 5, 2016, 7 pages.

Pamplona et al., "Tailored Displays to Compensate for Visual Aberrations", ACM Transactions On Graphics (TOG), vol. 31, No. 4, 2012, 12 pages.

le;.5qOffice Action with English translation for Korean Application No. 10-2017-7023720, dated May 12, 2018, 13 pages.

Office Action with English translation for Korean Application No. 10-2017-7023720, dated Nov. 30, 2018, 13 pages.

Communication pursuant to Article 94(3) EPC for European Application No. 16720682.0, dated Mar. 25, 2019, 6 pages.

\* cited by examiner

VIRTUAL EYEGLASS SET FOR VIEWING ACTUAL SCENE THAT CORRECTS FOR DIFFERENT LOCATION OF LENSES THAN EYES

CROSS-REFERENCE TO RELATED APPLICATION

This application claims priority to U.S. Provisional Application No. 62/155,424, filed on Apr. 30, 2015, entitled, "Virtual Eyeglass Set for Viewing Actual Scene that Corrects for Different Location of Contacts Than Eyes," the disclosure of which is hereby incorporated by reference.

TECHNICAL FIELD

This description relates to optical systems.

SUMMARY

According to an example embodiment, a virtual eyeglass set may include a frame, a first virtual lens and second virtual lens, and a processor. The frame may be configured to mount onto a user's head and hold the first virtual lens in front of the user's left eye and the second virtual lens in front of the user's right eye. The first virtual lens may be supported by the frame and the second virtual lens may be supported by the frame. Each of the first virtual lens and the second virtual lens may be supported by the frame so that when the virtual eyeglass set is mounted onto the user's head, a first side of the lens will face the user and a second side of the lens will face away from the user. Each of the first virtual lens and the second virtual lens may include a light field display on the first side, and a light field camera on the second side. The processor may be supported by the frame. The processor may be configured to construct, for display on each of the light field displays based on image data received via each of the light field cameras, an image from a perspective of the user's respective eye.

According to another example embodiment, a virtual eyeglass set may include a frame, a first virtual lens, a second virtual lens, and a processor. The frame may be configured to mount onto a user's head and hold the first virtual lens in front of the user's left eye and the second virtual lens in front of the user's right eye. The first virtual lens may supported by the frame and the second virtual lens may be supported by the frame. Each of the first virtual lens and the second virtual lens may be supported by the frame so that when the virtual eyeglass set is mounted onto the user's head, a first side of the lens will face the user and a second side of the lens will face away from the user. Each of the first virtual lens and the second virtual lens may include a display on the first side, and a wide angle camera on the second side. The processor may be supported by the frame. The processor may be configured to construct, for display on each of the displays by cropping images received by each of the wide angle cameras so that the display on each side of the respective lenses displays an image with a narrower angle than the respective wide angle camera so that the image represents a cone beginning from the user's respective eye.

According to another example embodiment, a virtual eyeglass set configured to display, at each of a right lens and a left lens, a light field image based on data received via a light field camera on an opposite side of the lens, the light field image presenting an image of objects beyond the virtual eyeglass set from a perspective of an eye of a user wearing the virtual eyeglass set.

The details of one or more implementations are set forth in the accompanying drawings and the description below. Other features will be apparent from the description and drawings, and from the claims.

DETAILED DESCRIPTION

A virtual eyeglass set may include a display on a first side of each lens facing a user wearing the virtual eyeglass set that displays the actual scene in front of the user, and a camera on a second side of each lens facing away from the user that captures the actual scene in front of the user. To correct for the distance that the user's eyes are behind the lenses, which creates different points of origin for the user's eyes than the cameras on the lenses, the cameras may include light field cameras with multiple viewpoints, and the virtual eyeglass set may include a processor that constructs an image from the vantage points of the eyes for display to the user, thereby eliminating a parallax effect. A light field camera, which may also be considered a plenoptic camera, may capture images from multiple positions and/or viewpoints, using multiple cameras or subcameras and/or multiple lenses. Capturing the images from multiple positions and/or viewpoints may allow images of three-dimensional scenes to be constructed from vantage points and/or positions from which images were not actually captured. To create an image of a three-dimensional scene, rather than a flat screen, the displays may include light field displays with multiple displays. The light field displays may present three-dimensional images to each of the user's eyes with depth cues so that looking into the light field display makes the user feel as if he or she is looking into an actual scene.

Figure 1A:
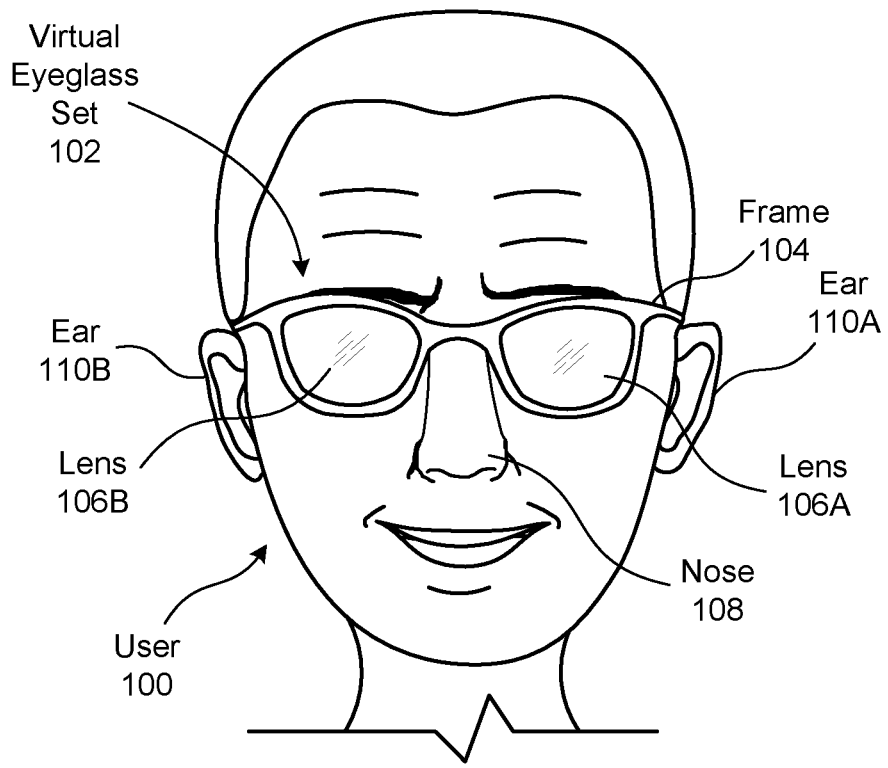
FIG. 1A is a diagram of a user wearing a virtual eyeglass set according to an example embodiment.

FIG. 1A is a diagram of a user 100 wearing a virtual eyeglass set 102 according to an example embodiment. The virtual eyeglass set 102 may rest and/or be mounted on the user's nose 108 and ears 110A, 110B. The virtual eyeglass set 102 may include a frame 104 that rests and/or is mounted on the user's head, including on the user's nose 108 and ears 110A, 110B.

The virtual eyeglass set 102 may include two lenses 106A, 106B. The lenses 106A, 106B may be considered virtual lenses because they appear to show an image of an actual scene in front of the user 100 as if the user 100 was looking through a clear and/or non-existent lens. The lenses 106A, 106B may be supported by the frame 104 so that when the virtual eyeglass set is mounted onto the user's 100 head, the lenses 106A, 106B are each directly in front of one of the user's eyes (not shown in FIG. 1A).

Figure 1B:
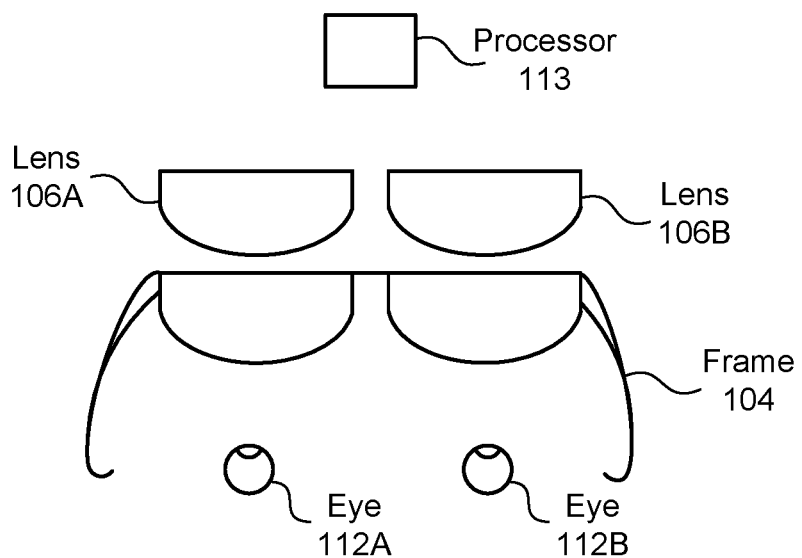
FIG. 1B is an exploded view of the virtual eyeglass set and the user's eyes according to an example embodiment.

FIG. 1B is an exploded view of the virtual eyeglass set 102 and the user's eyes 112A, 112B according to an example embodiment. As shown in FIG. 1B, the virtual eyeglass set 102 may include the frame 104, the lenses 106A, 106B, and a processor 113. The processor 113 may receive, from each of the lenses 106A, 106B, input from a camera (not shown in FIG. 2B) facing away from the user and may construct, for presentation and/or display on a display (not shown in FIG. 2B) on a first side of the lenses 106A, 106B facing the user, an image which has the same vantage point and/or perspective as the user's eyes 112A, 112B. The first light field display on the first side of the first lens 106A and/or left lens may display a first image which has the same vantage point and/or perspective as the user's first eye 112A and/or left eye, and the second light field display on the first side of the second lens 106B and/or right lens may display an image which has the same vantage point and/or perspective as the user's second eye 112B and/or right eye, creating an effect of a three-dimensional scene for the user.

Figure 1C:
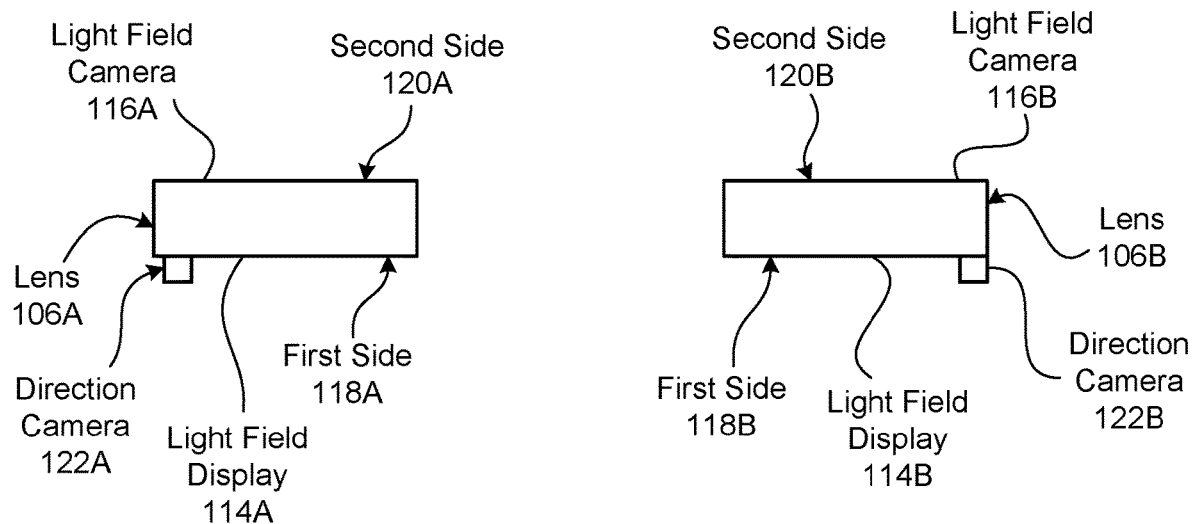
FIG. 1C is a top view showing lenses from the virtual eyeglass set according to an example embodiment.

FIG. 1C is a top view showing lenses 106A, 106B from the virtual eyeglass set 102 according to an example embodiment. As shown in FIG. 1C, each of the lenses 106A, 106B may include a first side 118A facing the user's eyes 112A, 112B (not shown in FIG. 1C) and a second side 120A, 120B facing away from the user 100.

The first side 118A, 118B of each lens 106A, 106B may include a light field display 114A, 114B. The light field display 114A, 114B may include multiple pixels to present a light field image to the user's 100 respective eye 112A, 112B. The light field image may be a reconstructed image of an actual live scene in front of the user 100 from the perspective and/or vantage point of the user's 100 respective eye 112A, 112B. The light field displays 114A, 114B of the two lenses 106A, 106B may, together, generate a three-dimensional image of the live actual scene in front of the user 100, so that the image looks as if the user 100 were looking through transparent and/or non-existent lenses 106A, 106B in the frame 104.

In an example embodiment, each of the lenses 106A, 106B may also include a direction camera 122A, 122B on the first side 118A, 118B of the lens 106A, 106B. The direction cameras 122A, 122B may capture images of the user's retinas and/or eyes 112A, 112B, and, in combination with the processor 113 (not shown in FIG. 1C), determine a direction that the user's 100 eyes 112A, 112B and/or retinas are pointing and/or a direction that the user 100 is looking. The processor 113 may, based on the direction determined based on the images captured by the direction cameras 122A, 122B, generate and/or construct images for display by each light field display 114A, 114B from the perspective and direction of the user's 100 eyes 112A, 112B based on the image data received from the light field cameras 116A, 116B and the captured direction, thereby generating images that are consistent with the direction in which the user 100 is looking.

In an example embodiment, instead of or in addition to the direction cameras 122A, 122B, the first side 118A, 118B of each of the lenses 106A, 106B may include an acuity camera. The acuity camera on the first side 118A, 118B may be a second camera in addition to the direction camera 122A, 122B, or the direction camera 122A, 122B may also perform the functions of the acuity camera. The acuity camera may capture an image of the user's 100 retina in the user's 100 respective eye 112A, 112B. Based on the image of the user's 100 retina captured by the acuity camera, the processor 113 (not shown in FIG. 1C) may determine a visual acuity of the user 100. The processor 113 may determine the user's 100 visual acuity including, for example, whether the user 100 is near-sighted, far-sighted, or has astigmatism in either or both eyes 112A, 112B. Based on the determination of the user's 100 visual acuity, the processor 113 may modify and/or construct the image for display by the respective light field display 114A to maximize the visibility of the image for the particular user. The processor 113 may also modify and/or construct the image based on input received from the user 100 regarding the user's 100 visual acuity.

The second side 120A, 120B of each lens 106A, 106B may include a light field camera 116A, 116B. The light field camera 116A, 116B of each lens 106A, 106B may include and/or be made up of multiple viewpoints, as shown in FIG. 1E, making the light field cameras 116A, 116B capable of rendering and/or capturing images from multiple positions, vantage points, and/or perspectives. The multiple viewpoints may correspond to the viewpoints of multiple cameras at different locations, each having its own lens, multiple cameras sharing a single lens, or a single camera using multiple lenses. Any or all of the lenses of the one or multiple cameras may include Fresnel lenses. Fresnel lenses may increase the field of view of each of the one or multiple cameras. The processor 113 may receive input from the multiple viewpoints of each light field camera 116A, 116B and may, based on the input received from the multiple viewpoints, construct images from positions and/or vantage points that were not occupied by any of the viewpoints.

Figure 1D:
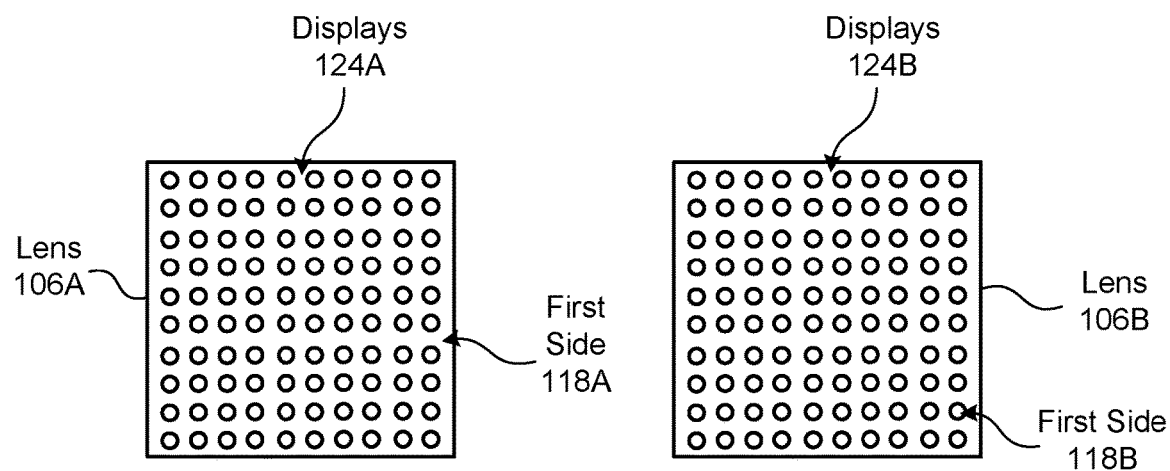
FIG. 1D is a rear view showing a first side of each of the lenses from the virtual eyeglass set according to an example embodiment.
Figure 1E:
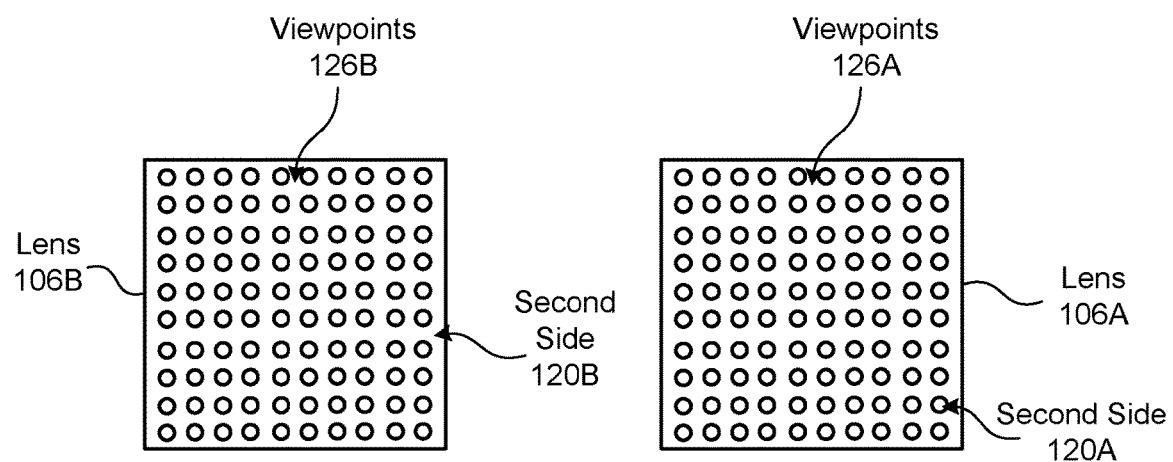
FIG. 1E is a front view showing a second side of each of the lenses from the virtual eyeglass set according to an example embodiment.

FIG. 1D is a rear view showing the first side 118A, 118B of each of the lenses 106A, 106B from the virtual eyeglass set 102 (of which the other components are not shown in FIG. 1D) facing the user 100 according to an example embodiment. As shown in FIG. 1D, the light field displays 114A, 114B (not labeled in FIG. 1D) on the first side 118A, 118B of each of the lenses 106A, 106B may be made up of, and/or may include, multiple subdisplays 124A, 124B. Each of the multiple subdisplays 124A, 124B may be a separate display with multiple pixels capable of generating a separate image, or each of the multiple subdisplays 124A, 124B may include a single pixel; the subdisplays 124A, 124B may collectively make up the light field displays 114A, 114B. The subdisplays 124A, 124B on each of the lenses 106A, 106B may collectively display the image constructed by the processor 113 (not shown in FIG. 1D). The subdisplays 124A, 124B may collectively form a grid or array, such as a ten-by-ten (10×10) grid or array, for a total of one hundred (100) subdisplays 124A, 124B in this example, on the first sides 118A, 118B of the lenses 106A, 106B, and/or may cover at least ninety percent (90%) of the first sides 118A, 118B of the lenses 106A, 106B.

FIG. 1E is a front view showing the second side 120A, 120B of each of the lenses 106A, 106B from the virtual eyeglass set 102 (of which the other components are not shown in FIG. 1E) facing away from the user 100 according to an example embodiment. As shown in FIG. 1E, the light field cameras 116A, 116B (not labeled in FIG. 1E) on the second side 120A, 120B of each of the lenses 106A, 106B may define, present, and/or capture multiple viewpoints 126A, 126B. Each of the multiple viewpoints 126A, 126B may be in a different location. The different locations of each of the multiple viewpoints 126A, 126B may enable the light field cameras 116A, 116B to capture the scene in front of the user 100 from multiple perspectives and/or vantage points.

Each of the multiple viewpoints 126A, 126B may include a single camera with a single lens and a single detector, or each of the viewpoints 126A, 126B may include a separate lens that refracts light onto a single and/or shared detector that receives light via all of the multiple lenses. The lenses associated with each of the viewpoints 126A, 126B may include Fresnel lenses. The viewpoints 126A, 126B may collectively form a grid or array, such as a ten-by-ten (10×10) grid or array, on the second sides 120A, 120B of the lenses 106A, 106B, and/or may cover at least ninety percent (90%) of the second sides 120A, 120B of the lenses 106A, 106B.

Figure 2:
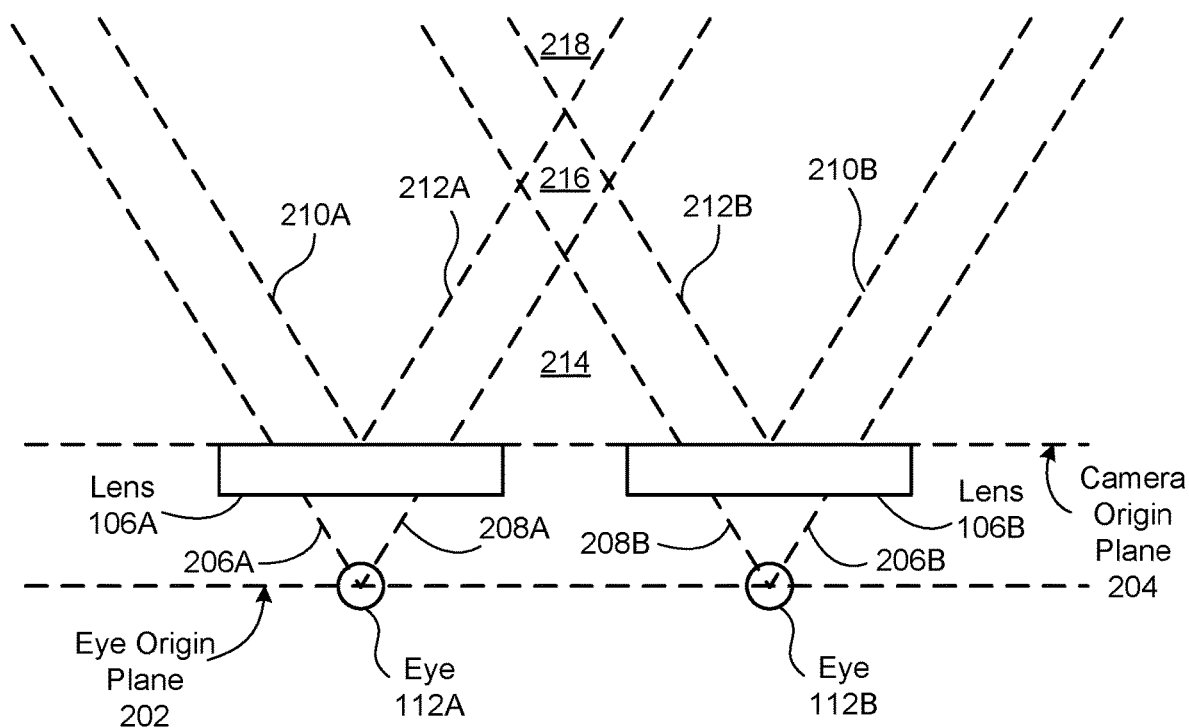
FIG. 2 shows fields of view of the user's eyes and the lenses according to an example embodiment.

FIG. 2 shows fields of view of the user's eyes 112A, 112B and the lenses 106A, 106B according to an example embodiment. In the example shown in FIG. 2, fields of view from the lenses 106A, 106B may have a same angle and/or sweep from a camera origin plane 204, the camera origin plane 204 being in front of an eye origin plane 202, as the user's eyes 112A, 112B have from the eye origin plane 202. In this example, the user's left eye 112A may have a field of view between lines 206A, 208A, and the user's right eye 112B may have a field of view between lines 206B, 208B. Also in this example, cameras centered on the lenses 106A, 106B may have fields of view between lines 210A, 212A and 210B, 212B. While FIG. 2 (as well as FIGS. 3A, 3B, 3C, and 4) shows triangular fields of view due to the two-dimensional representation, the fields of view may be conical in three-dimensional space.

In this example, objects in area 214 may not be visible to either the user's eyes 112A, 112B or the cameras. Objects between lines 208A and 212A, and between lines 208B and 212B, may be visible to one or both of the user's eyes 112A, 112B, but not to the camera centered on the lens 106A, 106B. Objects in area 216 may be visible to both of the user's eyes 112A, 112B, but not to either of the cameras in the centers of the lenses 106A, 106B. Cameras at additional points on the lenses 106A, 106B, and/or cameras with wider angles, may be required to capture images of objects in area 216.

Objects in area 218 may be visible to both of the user's eyes 112A, 112B and to cameras in the centers of the lenses 106A, 106B. However, without adjustment, displayed images based only on image data received by the cameras in the centers of the lenses 106A, 106B may appear closer than they actually are to the user's eyes 112A, 112B, due to a parallax effect resulting from a different angle of the object from the camera than an angle of the object from the user's eyes 112A, 112B. Multiple viewpoints 126A, 126B (not shown in FIG. 2), such as multiple viewpoints 126A, 126B on the second sides 120A, 120B of the lenses 106A, 106B as shown in FIG. 1E, may be required to construct an image from the perspective and/or vantage point of the user's eyes 112A, 112B.

Figure 3A:
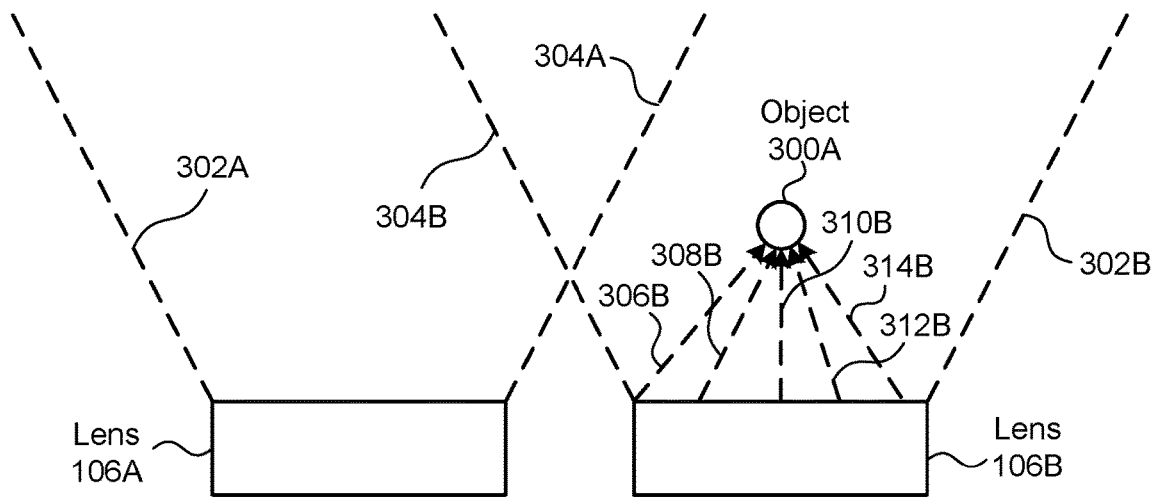
FIG. 3A shows the user's eyes and the lenses in an example in which an object is in the field of view of a second of the two lenses.
Figure 3B:
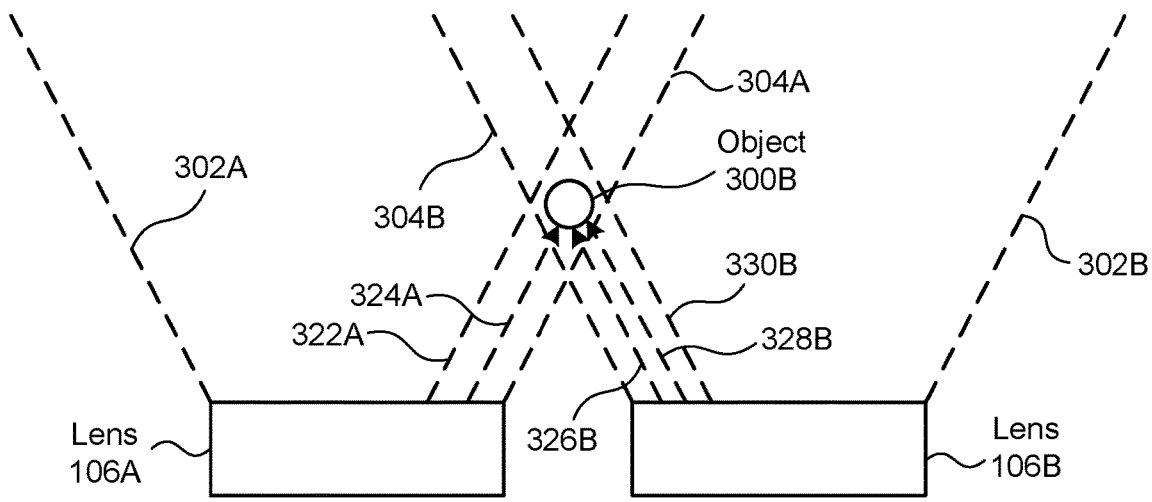
FIG. 3B shows the user's eyes and the lenses in an example in which an object is in a field of view of some of the viewpoints of each of the lenses.
Figure 3C:
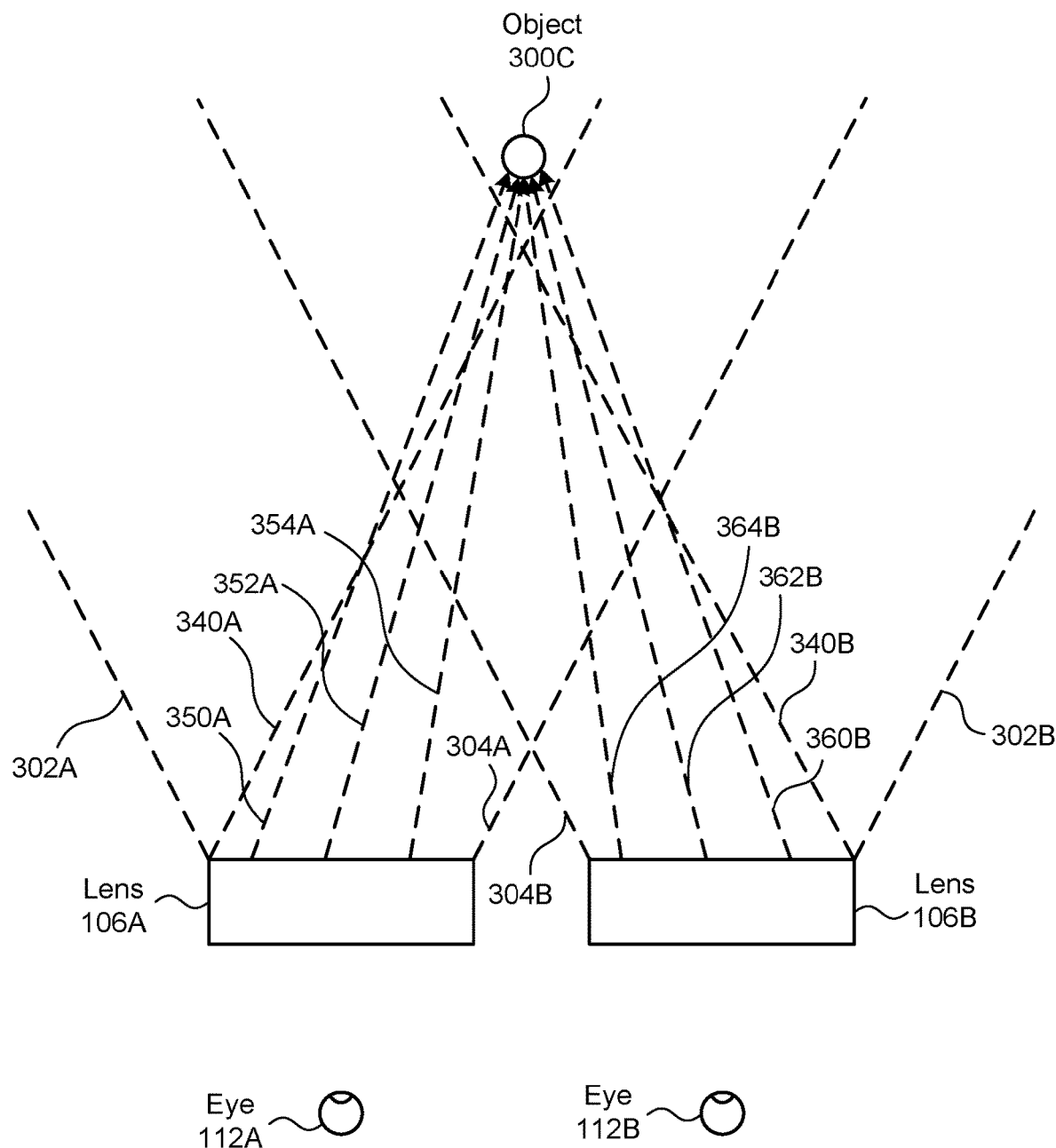
FIG. 3C shows the user's eyes and the lenses in an example in which an object is in a field of view of all of the viewpoints of each of the lenses.

FIGS. 3A, 3B, and 3B show perspectives on objects 300A, 300B, 300C in front of the lenses 106A, 106B from multiple viewpoints 126A, 126B on the second sides 120A, 120B of the lenses 106A, 106B. While FIGS. 3A, 3B, and 3C show the lenses 106A, 106B and lines indicating fields of view in two-dimensional, triangular areas, the lenses and fields of view may actually be conical in three-dimensional space.

FIG. 3A shows the user's eyes 112A, 112B and the lenses 106A, 106B in an example in which an object 300A is in the field of view of the second lens 106B but not the first lens 106A. As shown in FIG. 3A, the object 300A is outside and/or beyond the line 304A, which forms an outer boundary of the field of view of the multiple viewpoints 126A (not shown in FIG. 3A) of the first lens 106A, rendering the light field camera 116A (not shown in FIG. 3A) of the first lens 106A unable to capture any image of the object 300A from any perspective.

As shown in FIG. 3A, the object 300A is visible to some, multiple, or all of the viewpoints 126B on the second side 120B of the lens 106B. The lines 306B, 308B, 310B, 312B, 314B show the directions from the viewpoints 126B on the second side 120B to the object 300A. Based on the image data of the object 300A captured by the viewpoints 126B, the processor 113 (not shown in FIG. 3A) may generate an image from the vantage point of the user's 100 right and/or second eye 112B for display by the second light field display 114B.

FIG. 3B shows the user's eyes 112A, 112B and the lenses 106A, 106B in an example in which an object 300B is in a field of view of some of the viewpoints 126A, 126B (not shown in FIG. 3A) of each of the lenses 106A, 106B. As shown in FIG. 3B, the object 300B is in a field of view of one or more viewpoints 126A on the first lens 106A that form the origin and/or beginning point of one or more lines represented by the line 324A, but the object 300B is not in a field of view of one or more viewpoints 126A on the first lens 106A that form the origin and/or beginning point of one or more lines represented by the line 322A. Similarly, the object 300B is in a field of view of one or more viewpoints 126B on the second lens 106B that form the origin of one or more lines represented by the lines 326B, 328B, but the object 300B is not in a field of view of one or more viewpoints 126B on the second lens 106B that form the origin of one or more lines represented by the line 330B. The processor 113 (not shown in FIG. 3B) may generate images from the vantage points of both of the user's eyes 112A, 112B for display by the light field displays 114A, 114B (not labeled in FIG. 3B). The images for display by each of the light field displays 114A, 114B may be generated by the processor 113 based only on image data received from viewpoints 126A, 126B on a same lens 106A, 106B as the generated image will be displayed on, or the images may be generated based on image data from both of the lenses 106A, 106B on which the image will be displayed and on the opposite lens.

FIG. 3C shows the user's eyes 112A, 112B and the lenses 106A, 106B in an example in which an object 300C is in a field of view of all of the viewpoints 126A, 126B (not shown in FIG. 3A) of each of the lenses 106A, 106B. In this example, the processor 113 (not shown in FIG. 3C) can construct an image of the object 300C for display at each light field display 114A, 114B based on image data received from either some or all of the viewpoints 126A, 126B in the lens 106A, 106B at which the image will be displayed, or based on image data received from some or all of the viewpoints 126A, 126B in both of the lenses 106A, 106B.

Figure 4:
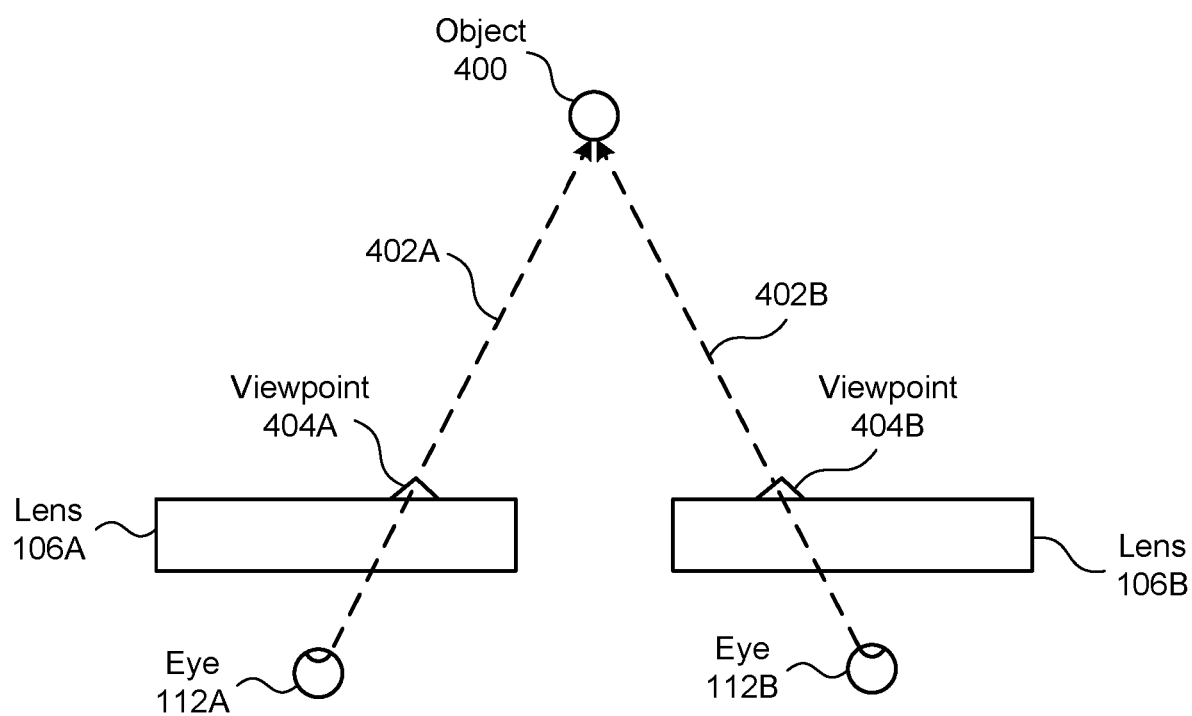
FIG. 4 shows the user's eyes and the lenses in an example in which one of the viewpoints of each of the lenses is intersected by a ray from one of the user's eyes to an object.

FIG. 4 shows the user's eyes 112A, 112B and the lenses 106A, 106B in an example in which one of the viewpoints 404A, 404B of each of the lenses 106A, 106B is intersected by a ray 402A, 402B from one of the user's eyes 112A, 112B to an object 400. Each of the lenses 106A, 106B may include multiple viewpoints 126A, 126B (not shown in FIG. 4) as described above. In an example implementation, the processor 113 (not shown in FIG. 4) and/or the direction cameras 122A, 122B (not shown in FIG. 4) may determine a direction in which the user 100 is looking and/or in which the retinas of the user's 100 eyes 112A, 112B are pointing. Based on the determined direction, the processor 113 may determine a single viewpoint 404A, 404B from the multiple viewpoints 126A, 126B in each lens 106A, 106B which is along and/or closest to a ray 402A, 402B extending from the user's eyes 112A, 112B to the object 400. When the user 100 is looking at the object 400, the determined single viewpoints 404A, 404B may be along the rays 402A, 402B and between the eyes 112A, 112B and the object 400. The processor 113 may generate images for display to the user 100 on the lenses 106A, 106B based only on the image data captured from the viewpoints 404A, 404B along and/or closest to the rays 402A, 402B. The images based only on the image data captured from the viewpoints 404A, 404B along the rays 402A, 402B may appear to have a same vantage point and/or perspective as the eyes 112A, 112B, enabling the user 100 to view the object 400 in the light field display 114A, 114B of the lenses 106A, 106B as if the lenses 106A, 106B were transparent and/or empty.

Figure 5:
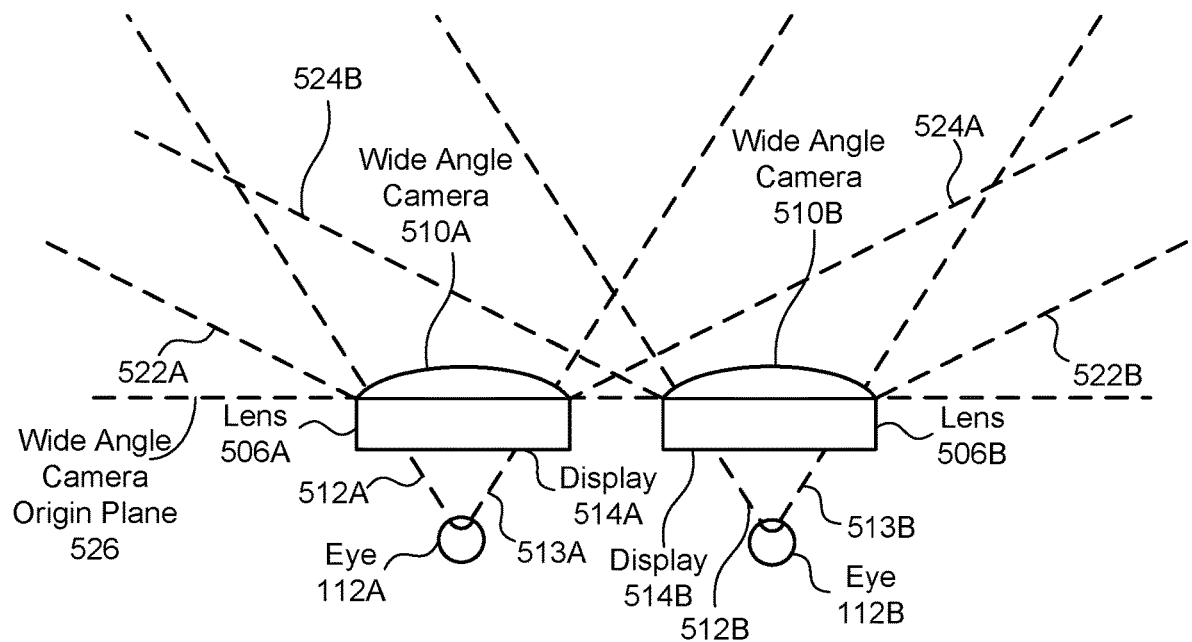
FIG. 5 shows the user's eyes and the lenses in an example in which each of the lenses includes a wide angle camera.

FIG. 5 shows the user's eyes 112A, 112B and lenses 506A, 506B in an example in which each of the lenses 506A, 506B includes a wide angle camera 510A, 510B. The lenses 506A, 506B may be mounted on a frame as described above with respect to the lenses 106A, 106B, may include light field displays and/or direction cameras as described above, and/or may be coupled to a processor as described above. In this example, the lines 512A, 513A show and/or bound the field of vision for the left and/or first eye 112A, and the lines 522A, 524A show and/or bound the field of vision for the left and/or first wide angle camera 510A. The lines 512B, 513B show and/or bound the field of vision for the right and/or second eye 112B, and the lines 522B, 524B show and/or bound the field of vision for the right and/or second wide angle camera 510B. As shown in FIG. 5, beyond the wide angle camera origin plane 526, the fields of view of the wide angle cameras 510A, 510B extend beyond the fields of view of the eyes 112A, 112B. To simulate the fields of view and/or perspectives of the eyes 112A, 112B, the processor 113 (not shown in FIG. 5) may crop out the portions of image data received from the wide angle cameras 510A, 510B that extend beyond the fields of vision of the eyes 112A, 112B, such as the areas or spaces between 522A and 512A, between 524A and 513A, between 512B and 524B, and between 522B and 513B. The processor 113 may construct, for display on each of the displays 514A, 514B by cropping the images received by each of the wide angle cameras 510A, 510B, an image with a narrower angle than the wide angle camera 510A, 510B, so that the constructed image represents a cone beginning from the user's 100 respective eye 112A, 112B. The processor 113 may thereby generate an image that is similar to an image that would be viewed directly by the eyes 112A, 112B.

Figure 6:
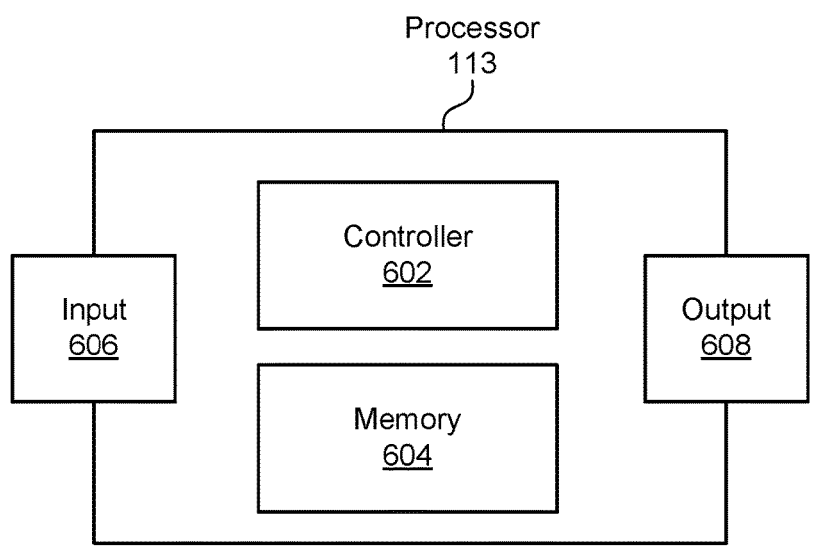
FIG. 6 shows a processor included in the virtual eyeglass set according to an example embodiment.

FIG. 6 shows a processor 113 included in the virtual eyeglass set 102 (not shown in FIG. 6) according to an example embodiment. The processor 113 may include one or more input nodes 606 that receive input data from the light field cameras 116A, 116B, direction cameras 122A, 122B, viewpoints 126A, 126B, viewpoints 404A, 404B, and/or wide angle camera 510A, 510B. The processor 113 may also include one or more output nodes 608 that output display data to the light field displays 114A, 114B and/or subdisplays 124A, 124B. The processor 113 may include a controller 602 and a memory 604. The memory 604 may include a non-transitory computer-readable storage medium that stores instructions for execution by the controller 602 and data, such as the received image data and the generated display data. The controller 602 may, by executing the instructions stored by the memory 604, generate the display data for presentation by the light field displays 114A, 114B and/or subdisplays 124A, 124B, as described above with respect to the processor 113.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A virtual eyeglass set, comprising:
a frame configured to mount onto a user's head and hold a first virtual lens in front of the user's left eye and a second virtual lens in front of the user's right eye;
the first virtual lens supported by the frame and the second virtual lens supported by the frame, each of the first virtual lens and the second virtual lens being supported by the frame so that when the virtual eyeglass set is mounted onto the user's head, a first side of the lens will face the user and a second side of the lens will face away from the user, each of the first virtual lens and the second virtual lens comprising:
a light field display on the first side;
a direction camera on the first side configured to capture a direction that the user's respective eye is facing; and
a light field camera on the second side, the light field camera being configured to capture images from multiple viewpoints; and
a processor supported by the frame, the processor being configured to construct, for display on each of the light field displays based on image data from the multiple viewpoints received via each of the light field cameras and the captured direction, an image from a perspective of the user's respective eye, the user's respective eye being behind the light field camera.

2. The virtual eyeglass set of claim 1, wherein each of the light field cameras is configured to capture the image data.

3. The virtual eyeglass set of claim 1, wherein each of the light field cameras includes a Fresnel lens.

4. The virtual eyeglass set of claim 1, wherein each of the light field cameras includes multiple detectors and multiple lenses.

5. The virtual eyeglass set of claim 1, wherein each of the light field cameras includes a single detector and multiple lenses.

6. The virtual eyeglass set of claim 1, wherein each of the light field cameras includes multiple cameras.

7. The virtual eyeglass set of claim 1, wherein:
each of the light field cameras includes multiple cameras configured to capture the images from the multiple viewpoints; and
the processor is configured to construct the image based on one of the multiple cameras for which the viewpoint is closest to a ray extending from the user's respective eye in the direction that the user's respective eye is facing.

8. The virtual eyeglass set of claim 1, wherein each of the light field displays is configured to display the constructed image.

9. The virtual eyeglass set of claim 1, wherein each of the light field displays includes multiple pixels covering at least ninety percent (90%) of the first side of the virtual lens.

10. The virtual eyeglass set of claim 1, wherein each of the light field cameras includes multiple cameras covering at least ninety percent (90%) of the second side of the virtual lens.

11. The virtual eyeglass set of claim 1, wherein each of the light field cameras includes a ten-by-ten (10×10) grid of cameras on the second side of the virtual lens.

12. The virtual eyeglass set of claim 1, wherein the processor is configured to construct:
a first image for display on the light field display on the first virtual lens from a perspective of the user's left eye based on image data received via the light field camera on the first virtual lens; and
a second image for display on the light field display on the second virtual lens from a perspective of the user's right eye based on image data received via the light field camera on the second virtual lens.

13. The virtual eyeglass set of claim 1, wherein the processor is configured to construct the image based on the image data received via each of the light field cameras and a visual acuity of the user.

14. The virtual eyeglass set of claim 13, wherein:
each of the first virtual lens and the second virtual lens further comprises an acuity camera on the first side configured to capture an image of the user's retina; and
the processor is configured to determine the visual acuity of the user based on the image of the user's retina.

15. A virtual eyeglass set, comprising:
a frame configured to mount onto a user's head and hold a first virtual lens in front of the user's left eye and a second virtual lens in front of the user's right eye;
the first virtual lens supported by the frame and the second virtual lens supported by the frame, each of the first virtual lens and the second virtual lens being supported by the frame so that when the virtual eyeglass set is mounted onto the user's head, a first side of the lens will face the user and a second side of the lens will face away from the user, each of the first virtual lens and the second virtual lens comprising:
a display on the first side;
a direction camera on the first side configured to capture an image of the user's respective eye; and
a wide angle camera on the second side; and
a processor supported by the frame, the processor being configured to construct, for display on each of the displays by cropping images received by each of the wide angle cameras so that the display on each side of the respective lenses displays an image with a narrower angle than the respective wide angle camera so that the image represents a cone beginning from the user's respective eye, the user's respective eye being behind the respective lens.

16. A virtual eyeglass set configured to display, at each of a right lens and a left lens, an image based on captured directions of a user's eyes and data received via one of multiple cameras on an opposite side of the lens, the one of the multiple cameras being selected based on the one camera being closest to a ray extending from the eye of the user wearing the virtual eyeglass set in a direction that the user's respective eye is looking, the captured direction that the user's respective eye is looking being determined based on a direction camera on an opposite side of the lens from the multiple cameras.

17. The virtual eyeglass set of claim 1, wherein the image constructed for each of the respective light field displays is from a vantage point that was not occupied by any of the viewpoints captured by the respective light field camera.

* * * * *